United States Patent [19]

Stelling

[11] Patent Number: 5,298,996
[45] Date of Patent: Mar. 29, 1994

[54] STEREO SIGNAL MONITORING

[75] Inventor: David N. Stelling, 88 Devonshire Avenue, Southsea, Portsmouth, Hampshire PO9 9EG, United Kingdom

[73] Assignees: Hamlet Video International Limited, Buckinghamshire; David N. Stelling, Hampshire, both of United Kingdom

[21] Appl. No.: 752,572

[22] PCT Filed: Mar. 13, 1990

[86] PCT No.: PCT/GB90/00374
§ 371 Date: Sep. 11, 1991
§ 102(e) Date: Sep. 11, 1991

[87] PCT Pub. No.: WO90/10997
PCT Pub. Date: Sep. 20, 1990

[30] Foreign Application Priority Data

Mar. 13, 1989 [GB] United Kingdom ............... 8905686

[51] Int. Cl.⁵ .................................. H04N 17/00
[52] U.S. Cl. ........................ 348/180; 348/578
[58] Field of Search ............... 358/139, 22 R, 22, 81, 358/82, 174, 10, 183; 381/1, 11; 340/721; H04N 9/02, 17/00

[56] References Cited

U.S. PATENT DOCUMENTS

| 3,940,789 | 2/1976 | Kratz | 358/82 |
|---|---|---|---|
| 4,001,880 | 1/1977 | Delikat | 358/82 |
| 4,032,972 | 6/1977 | Saylor | 358/142 |
| 4,068,262 | 1/1978 | Sandler | 358/82 |
| 4,081,829 | 3/1978 | Brown | 358/82 |
| 4,128,846 | 12/1978 | Robinson | 358/82 |
| 4,149,188 | 4/1979 | Nagai | 358/139 |
| 4,157,533 | 6/1979 | Duvall | 358/174 |
| 4,167,752 | 9/1979 | Liebler | 358/82 |
| 4,176,375 | 11/1979 | Scarpelli | 358/82 |
| 4,237,482 | 12/1980 | Brentlinger | 358/81 |
| 4,267,561 | 5/1981 | Karpinsky | 358/82 |
| 4,560,981 | 12/1985 | Jackson | 340/721 |
| 4,648,113 | 3/1987 | Horn | 358/82 |
| 4,797,746 | 1/1989 | Ashcraft | 358/141 |

FOREIGN PATENT DOCUMENTS

114681 7/1983 Japan ................ 358/142

Primary Examiner—Victor R. Kostak
Assistant Examiner—Chris Grant
Attorney, Agent, or Firm—Dennison, Meserole, Pollack & Scheiner

[57] ABSTRACT

To monitor stereo audio signals associated with a TV video signal, the two stereo audio channels are converted to digital form (20, 21), a memory (22) has bits written into it at addresses formed by successive pairs of such values in digital form to form a map therein of a Lissajou figure representing the relationship between the two channels, the memory is read out linearly in synchronism with the operation of the monitor, and the output inserted into the TV video signal (VID) being displayed. The memory may be read out diagonally, so as to produce a diamond display, by a line counter (LB, RB) and a bit counter (LL, RL) for each channel, the line counters being loaded with predetermined counts at the beginning of each field and counting lines and the bit counters being loaded from the line counters at the beginning of each line and counting bits along the lines, three of the counters (LL, RL, RB) counting in one direction and the fourth (RL) in the other. The counters (LL, LB, RL, RB) are larger than the memory, the excess portion of the counts being used to control (via 45, 52) the enabling of the memory read-out. ACG (automatic volume control) and graticule generation may be provided.

19 Claims, 4 Drawing Sheets

STEREO SIGNAL MONITORING

BACKGROUND OF THE INVENTION

The present invention relates to the monitoring of stereo audio signals associated with TV video signals.

In broadcasting generally, and in television broadcasting in particular, the provision of stereo sound is becoming commonplace. This poses special problems in the production and monitoring of TV programmes. It is difficult to monitor sound quality adequately by ear, particularly under production conditions, and some form of instrumentation which gives an indication of sound amplitude and phase is desirable. In particular, it is desirable to be able to monitor the relationship between the two channels of a stereo audio signal.

A well-known technique for doing this is to provide a separate monitor consisting of a conventional oscilloscope which has the two channels of the stereo signal fed to its X and Y inputs respectively; the resulting display is a Lissajou figure. However, this arrangement has the disadvantage that it is separate from the display of the associated TV picture on a TV monitor. The operator therefore has to make an active effort to check the oscilloscope, and there is also ample opportunity for error in associating the oscilloscope display with the appropriate one of a large number of monitors in a typical array of TV monitors.

A stereo audio monitor has also been developed which uses a TV-type picture raster display instead of an oscilloscope vector-type display, with the Lissajou figure being synthesized from the two audio signals as a TV-type video signal. This, however, suffers from the same disadvantages as the oscilloscope display.

SUMMARY OF THE INVENTION

The main object of the present invention is to provide means for monitoring stereo audio signals associated with a TV video signal which alleviates or overcomes these problems. Subsidiary objectives are to achieve convenience and simplicity.

Accordingly the present invention provides an audio signal monitoring system for stereo audio signals associated with a TV video signal, comprising means for converting the two channels of a stereo audio signal to digital form and writing successive pairs of values into a memory to form a map therein of a Lissajou figure representing the relationship between the two channels, and means for reading out the memory linearly in synchronism with the operation of a TV monitor and inserting the output into the TV video signal being displayed on the monitor.

Preferably the memory is read out diagonally so as to produce a diamond display on the monitor in which identical signals on the two audio channels are represented by a vertical line.

The read-out means preferably comprise a line counter and a bit counter for each channel, the line counters being loaded with predetermined counts at the beginning of each field and counting lines and the bit counters being loaded from the line counters at the beginning of each line and counting bits along the lines, three of the counters counting in one direction and the fourth in the other. Preferably the counters are larger than the memory, the excess high order portion of the counts being used to control the enabling of the memory read-out. Preferably also there is a display location selection memory containing one or more pairs of pre-stored counts any pair of which can be selected for loading into the line counters.

The system may include means for generating a graticule on the diamond display. Such means may comprise either logic circuitry fed from the counters or a second memory operated in parallel with the first memory.

The means for inserting the memory output into the TV signal may comprise pulse stretching means, adder means, and gating means. The gating means are preferably controlled partially or wholly by the excess portion of the counts. The insertion means may include means for either superimposing the Lissajou figure on the video picture on the TV monitor or means for generating a uniform background to the Lissajou figure in the diamond. The insertion means may also include means for inserting the graticule at a different brightness to that of the Lissajou figure.

The system may include automatic gain control means for controlling the size of the Lissajou figure. Such means may comprise a counter which is caused to count up or down depending on whether the magnitude of the input audio signal is greater or less than the count, the counting rate preferably being larger if the count is low than if it is high, and the count preferably being held above some minimum signal value. Alternatively the counter may count down gradually if the count is high, and be reset immediately to the magnitude of the input audio signal if the count is low. The counter preferably feeds a digital-to-analog converter which provides a reference voltage to the analog-to-digital converters.

The circuitry of the system may be accommodated substantially completely on a printed circuit board which plugs into the monitor. The controls are preferably readily accessible e.g. by being made available at the front of the monitor, or by being on a self contained control unit coupled to the board by a wire or infra-red links.

An audio signal monitoring system embodying the invention will now be described, by way of example, with reference to the drawings, in which:

DESCRIPTION OF THE INVENTION

Figure 1:
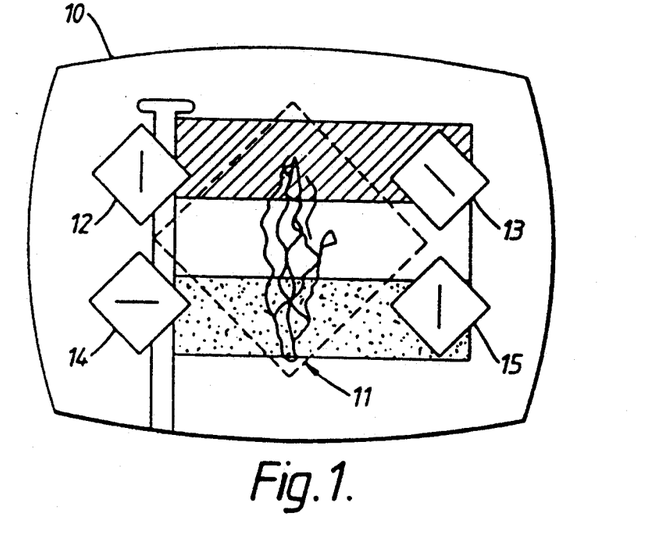
FIG. 1 is a composite drawing showing various forms of display which can be generated by the system.

FIG. 1 shows the face 10 of a TV monitor, which will normally have a TV picture (here shown as a tricolour flag on a flagpole) displayed on it. The present system operates to superimpose any one of the five audio signal displays 11 to 15 on the picture. (All five possible displays are shown on the same drawing for conciseness and to illustrate the relationship between them.) If the large display is selected, then this display 11 is presented as a Lissajou figure drawn as a white line over the main picture but not otherwise obscuring it. (This is shown in negative form in the drawing, i.e. as a black line.) If a small display is selected, then one of the displays 12 to 15 is presented as a Lissajou figure drawn as a white line on a black background, obscuring a part of the main picture. The small display can be located in any corner of the main picture, as shown.

The display is generated as a Lissajou figure in a diamond-shaped field, i.e. a square field skewed at an angle of 45°, as shown. The two audio channels drive the display parallel to the +45° and −45° directions. The large display 11 shows the Lissajou figure for a typical stereo audio signal in which the two channels are in the proper relationship. Display 12 shows the same situation in which the signals in the two channels are identical; the Lissajou figure becomes a vertical straight line, produced by two identical signals. Display 13 shows the effect of the total loss of the right-hand channel; the Lissajou figure becomes a straight line pointing to the left, produced by only the left-hand channel signal. Display 14 shows the effect of a phase reversal in one channel; the Lissajou figure is a horizontal line. Display 15 shows the effect of a DC bias or offset in one of the channels; the Lissajou figure is a vertical straight line which is displaced from the centre of the diamond in a direction parallel to one pair of edges of the diamond. Other faults also generally produce distinctive effects; for example, a phase shift in one channel will spread out the Lissajou figure from a line to an ellipse. Combinations of faults will generally produce combinations of the individual effects.

Figure 2A:
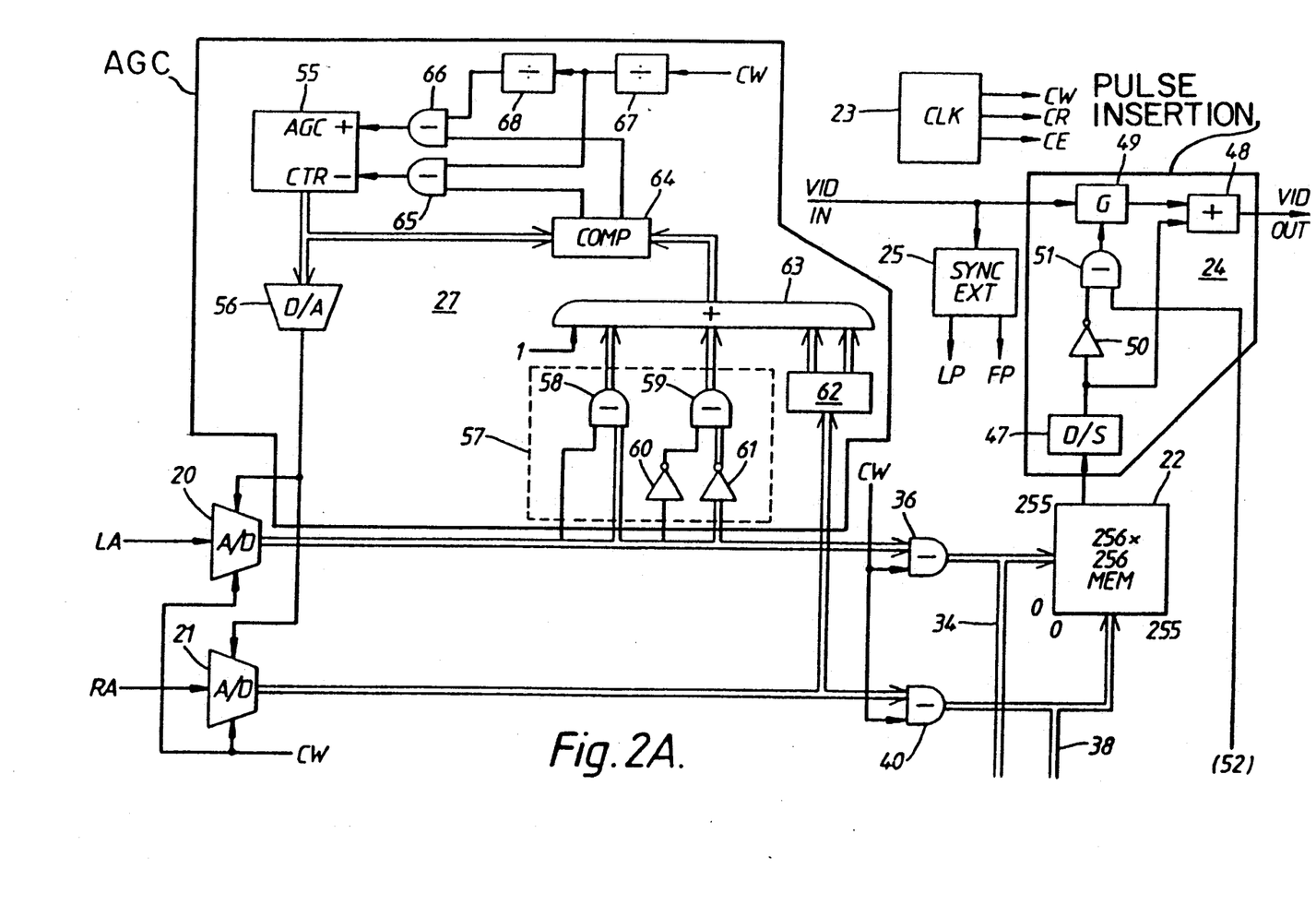
FIGS. 2A and 2B together are a block diagram of the system.
Figure 2B:
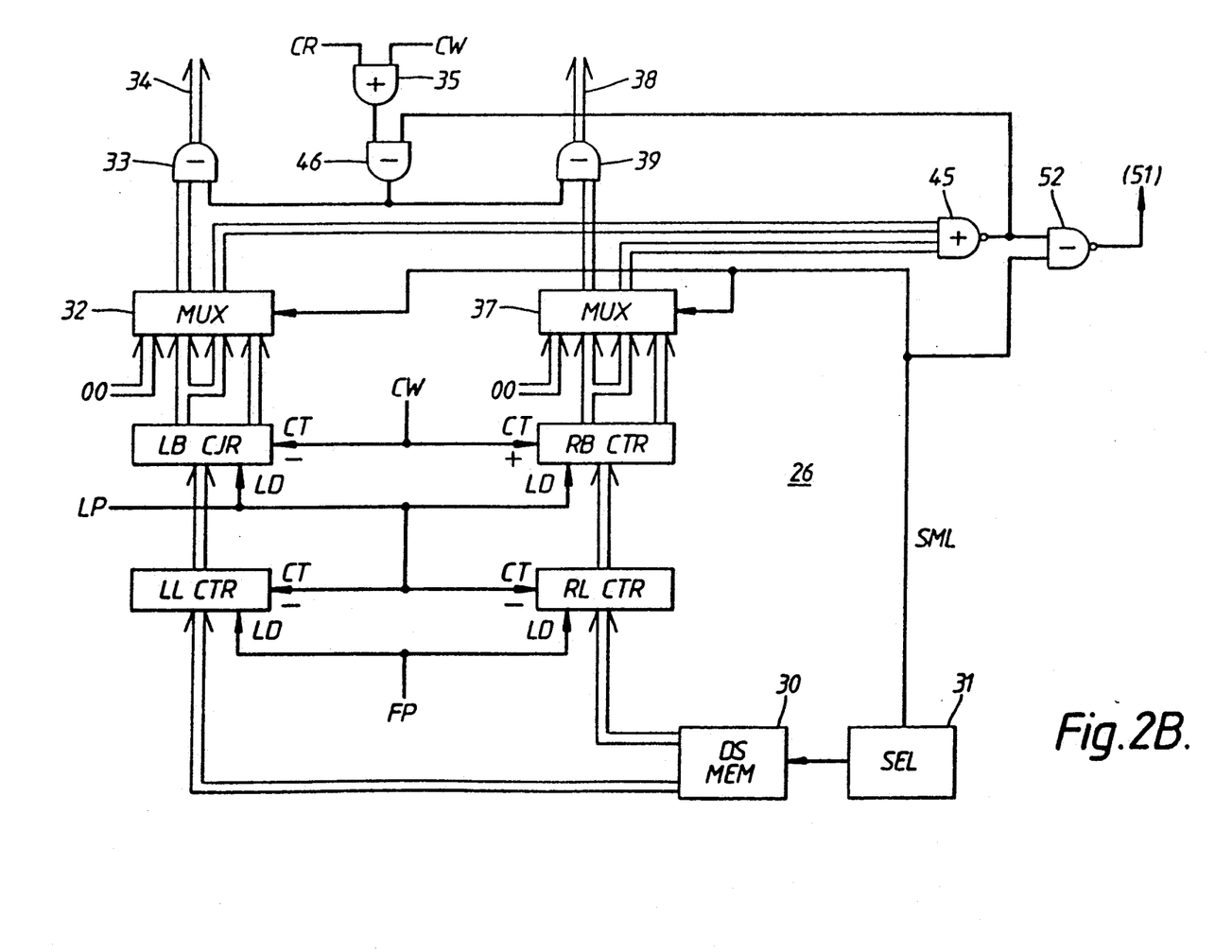

FIGS. 2A and 2B are a block diagram of the circuitry of the system. The two audio channels, left audio LA and right audio RA, feed a pair of analog-to-digital converters 20 and 21, which produce 8-bit signals which are fed to a memory 22. This memory is a 64 Kbit static RAM, which acts as a 256×256×1 bit memory. A clock unit 23 includes a free-running 20 MHz oscillator the output of which is divided down by 3 to produce three sequential signals CW (write), CR (read), and CE (erase) each at 6.7 MHz. (Obviously the erase signals would not be required if a dynamic RAM were used instead). The CW signal is used to clock the A/D converters 20 and 21, and their outputs are fed to the address inputs to the memory 22 to write a 1 bit into the selected address (also clocked by the CW clock signal). Thus the Lissajou figure is mapped into the memory 22 bit by bit along the line of the figure as it is generated.

The "raw" video signal to the monitor, carrying the TV picture to be displayed, is fed as signal VID IN to a pulse insertion unit 24, where the selected display (11, 12, 13, 14, or 15) is inserted in it, to produce the combined video signal VID OUT which is used to modulate the CRT of the monitor. The signal VID IN is also fed to a sync pulse extractor 25, which extracts the line pulses LP and field pulses FP to control the operation of the system.

The system also includes memory read addressing circuitry, shown generally at 26, the purpose of which is to read out the contents of the memory 22. This readout is arranged to take place bit by bit along successive diagonal lines through the memory 22; each diagonal line is read out during the appropriate part of a scan line of the monitor, and the read-out steps on from one diagonal to the next as the TV scan steps on from one line to the next. It will be realized that this diagonal scanning of the memory 22 results in its contents being mapped onto the monitor display as a skewed square or diamond, as shown in FIG. 1. Each bit is read out from the memory 22 on the clock pulse CR, and is passed to the pulse insertion unit 24; each bit read-out is followed by its erasure from the memory on the following CE clock pulse. The memory read circuitry changes state on the CW clock pulses.

An AGC circuit 27 is fed by the outputs of the A/D converters 20 and 21 and controls their sensitivity, so that the Lissajou figure is enlarged if the audio level is low.

The A/D converters 20 and 21 each produce an 8-bit output, with the zero point of the analog input being at the middle of the digital range. That is, the digital output corresponding to and input audio signal voltage level of 0 V is 7 F or 80 (hexadecimal); digital outputs of 00 and FF correspond to peak negative and positive inputs respectively. This ensures correct location of the Lissajou figure in the memory 22 and the display 11, 12, 13, 14, or 15.

The memory read addressing circuitry 26 comprises a pair of counters, a line counter and a bit counter, for each channel; that is, a line counter LL and a bit counter BL for the L channel and a line counter LR and a bit counter BR for the R channel. The line counters are loaded with predetermined counts at the start of each field, these predetermined counts determining the position of the display, and count the line pulses LP. Each bit counter is loaded with the contents of the corresponding line counter at the start of each line, and counts the clock pulses CW. Three of the counters count in the same direction, while the fourth counts in the opposite direction.

Figure 3:
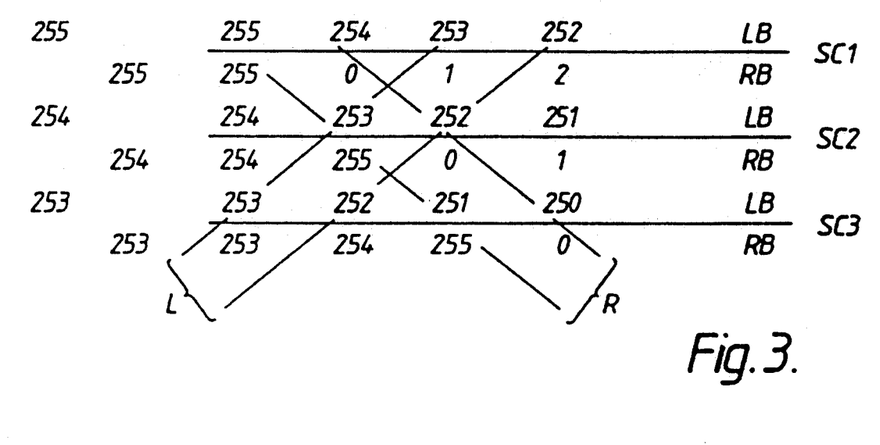
FIGS. 3 to 5 are diagrams illustrating the operation of the system.

FIG. 3 shows the fine detail of the counter operation. Three successive scan lines SC1 to SC3 of the monitor are shown, with the counts of the left and right line counters LL and RL shown to the left of the starts of the line scans. For illustrative purposes, it is assumed that the line counters' counts are 255 for both the counters for the first line scan shown; both these counters count down for successive line scans. The counts of the left bit counter LB are shown above each line and those of the right bit counter RB shown below the line. As shown, these counters are set to the counts in the line counters at the beginning of each line scan; thereafter, these counters count the CW clock pulses as the line scan progresses. The LB counter counts down, while the RB counter counts up. Corresponding counts of counter LB form a pattern of diagonal lines L in one direction and corresponding counts of counter RB form a pattern of diagonal lines R in the other direction, as shown.

Figure 4:
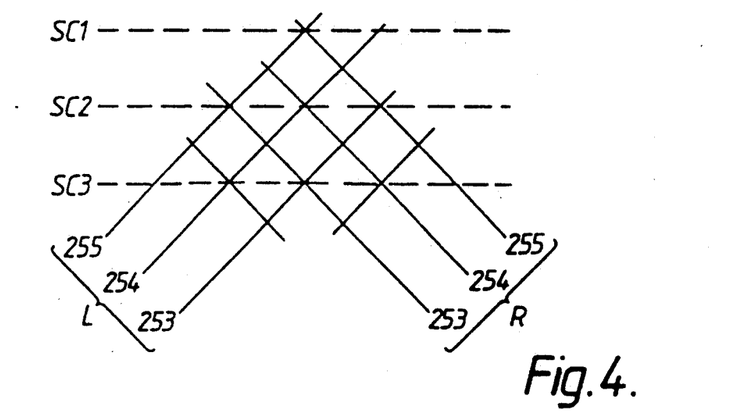

FIG. 4 is a similar diagram on a smaller scale, showing the relationship between the L and R count lines and the scan lines. Each pair of bit counter counts, an LB count and an RB count, corresponds to the read-out of the bit in the corresponding address in the memory 22. Comparing the bit counter count pattern of FIG. 4 with the address ordering shown in FIG. 1, it is evident that the bit pattern in the memory as shown in FIG. 1 is mapped onto the monitor with an anticlockwise rotation of 45°, giving a diamond pattern as required. The clock frequency of the CW clock pulses is chosen so that the diamond is approximately square.

It is apparent from FIG. 4 that only half the bits in the memory 22 are utilized; those whose L and R addresses in the memory 22 have opposite parities are not read out. This means that the effective size of the memory 22 is only 32 Kbits. The remaining 32 Kbits will be written into but will never be read out.

If the clock frequency is doubled and the clock pulses are directed to the two counters alternately, so that they count alternately instead of simultaneously, all bits in the memory 22 can be utilized. In practice, however, this refinement results in an improvement which is relatively marginal in view of the fact that the present system is primarily intended to give qualitative rather than quantitative information.

It will also be seen that no distinction is made between successive fields. Because successive fields are interlaced but the read-out is identical for all fields, this means that the display oscillates up and down by one line on the two successive fields of a frame. This minor oscillation does not cause any significant flickering or irritation to the user, and is therefore accepted. (The Lissajou figure will also normally change on each successive field, making the oscillation normally undetectable). It will however be realized that by a slight elaboration of the arrangements for setting the counters at the beginning of each field, the 32 Kbits not read out on one field can be read out on the next field, thus using the whole of the memory 22 and achieving interlace. (For perfect interlace, the counter clocking must also be delayed by half a clock period on alternate fields.)

It will be clear that the location of the diamond pattern on the screen depends on where the start point (counts of 255 in both counters) is, and this depends on the presetting of the counts in the line counters at the start of each frame.

As described so far, the diamond is generated with a height of 256 lines and a width of 256 dots. Its physical width is therefore determined by the number of dots in a line. A line scan (in a 50 Hz, 625-line system) takes 64 μs (of which 12 μs is used for flyback), and a dot time is 0.17 μs, i.e. the reciprocal of the 20 MHz frequency of the clock unit 23. This gives a roughly square diamond.

To generate the smaller patterns 12 to 15, the size of the memory is effectively reduced by a linear factor of 4. This is achieved by effectively stepping the counts of the bit counters LB and RB on by 4's instead of 1's. This in turn is achieved by providing multiplexers in the outputs of the bit counters, one set of inputs being fed with the full 8 bit count outputs and the other set being fed with the bottom 6 bits transposed up by 2 bits (and the bottom 2 bits being forced to 0). The effective size of the memory 22 is thus 2 Kbits for any of the small patterns 12 to 15.

The full memory size of 64 Kbits is continually being written into by the signals from the A/D converters 20 and 21, but only the active 2 Kbits are read out for a small display. Of course, if the large display 11 is selected after a small display has been running for some time, the first field of the large display will read out the accumulation of 1 bits in the extra 30 Kbits of the active 32 Kbits of locations used for the large display. However, it will take only a single field for these locations to be cleared, and this transient effect can be ignored. (However, if it is desired to suppress this effect, the display can be blanked for the first frame following the change of size).

Also, as described so far, the addressing of the memory 22 will cycle each time a bit counter reaches 0 and restarts at 255. This would result in a repeated pattern of diamonds covering the whole of the monitor. To ensure that only one diamond is displayed, the counters are extended by an additional 4 high order bits, and the high order bits are decoded and memory read-out is enabled only for high-order values of 0 in both bit counters. In effect, the bit counters generate an extended pattern of 16×16 diamonds as shown fragmentarily in FIG. 5, in which each diamond of the extended pattern is labelled with the two hexadecimal values of the top 4 bits of the two bit counters (in the order LR). Thus diamond 00 is selected, and the other 255 diamonds of the extended pattern are not displayed. The extended pattern is large enough that the monitor screen occupies less than half its width and height even if small diamonds are being generated, and the presetting of the line counters can thus locate the pattern at any desired location on the screen.

Referring again to FIGS. 2A and 2B, a display select memory DS MEM 30 has permanently stored in it the starting counts for the LL and RL counters. There are 10 such pairs of counts stored in it, 5 for the 5 displays for the 625-line standard and 5 for the corresponding displays for the 525-line standard. By choosing suitable values for these stored counts, the displays can be located at any desired locations on the monitor screen. A switchable selection unit 31 selects the appropriate pair of counts; this unit may be controlled by switches on the monitor or by a remote control unit connected to the monitor by either a wire link or an infra-red link.

These counts are permanently supplied to the two line counters LL and RL. The load control inputs LD of these counters are fed with the field pulses FP, which loads them with these counts at the start of each field. The count inputs CT− (both these counters counting down) of these counters are fed with the line pulses LP. These line pulses are also fed to the load control inputs LD of the two bit counters LB and RB, which are also fed with the contents of the LL and RL counters respectively for loading. The count inputs of the bit counters LB and RB are CT− and CT+ respectively (these two counters counting down and up respectively) and are fed with the CW pulses from the clock 23. All four of these counters are 12-bit counters.

The output of the bit counter LB is split into the lower 10 bits and the upper 2 bits. These two outputs are fed to one set of corresponding inputs of a multiplexer 32, and the lower 10 bits are transposed up by 2 bits to the top 10 bits of the other set of inputs of the multiplexer, the bottom 2 bits of this set being fed with 00. The bottom 8 bits of the output of this multiplexer are fed to a set of AND gates 33 which feed the L address bus 34 of the memory 22. The gates 33 are enabled by an OR gate 35 which is fed with the CR and CW clock pulses from clock 23. The L bus 34 is also fed from the A/D converter 20 via a set of AND gates 36 which are enabled by the CW clock pulses from clock 23. Thus the bus 34 is fed from the A/D converter 20 for writing a bit of the Lissajou figure, and from the counter LB for reading a bit and then erasing it.

The right-hand channel is treated similarly, with counter RB feeding a multiplexer 37 which feeds the address bus 38 via a set of AND gates 39. A/D converter 21 feeds the bus 39 via a set of AND gates 40.

The A/D converters and the bit multiplexers may of course be tristate devices effectively incorporating the AND gates which they are shown as feeding.

Figure 5:
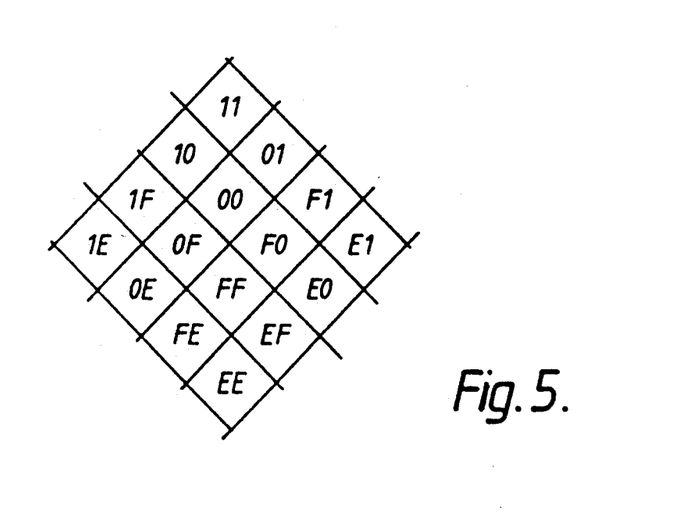

The top 4 bits of from each of the multiplexers 32 and 37 are fed to a NOR gate 45, which produces a 1 only when all bits fed to it are 0, i.e. when the bit counters LB and RB are selecting a point in the diamond 00 in the extended pattern shown in FIG. 5. This output is fed to an AND gate 46, which is interposed between the OR gate 35 and the gates 33 and 39, to allow the bit counts to be fed to the memory 22 only for the selected diamond. The output of the memory 22, i.e. the sequence of bits read out from it, is fed to a resettable one-shot 47 which stretches the pulses to a length which will be observable on the monitor. The stretched pulses are fed to an adder circuit 48, which is also fed with the incoming video signal, and produces the video output signal VID OUT. The bits read out from the memory 22 are inserted into the video signal as pulses at (or slightly below) the full white level.

The raw video signal VID IN is fed to the adder circuit 48 via an analog gate circuit 49. This gate is disabled by the pulses from the one-shot 47, which are fed to its control input via an inverter 50 and an AND gate 51. Thus the video signal is prevented from reaching the adder circuit 48 when a pulse is being inserted; this prevents the video signal VID OUT from exceeding the full white level. (Obviously, a limiter operating at the full white level could be used instead.) If desired, a 1 (or a continuous sequence of 1's) from the memory 22 can have black level pulses inserted before and/or after the white level signal corresponding to those bits, to give greater emphasis to the Lissajou figure.

The selection unit 31 produces an output on a line SML when any one of the small displays 12 to 15 is selected. This signal is fed to the multiplexers 32 and 37, to select the upwardly transposed counts from the bit counters LB and RB. This signal is also fed to a NAND gate 52, which is also fed by gate 45, and which feeds the AND gate 51. When the Lissajou figure is being displayed, i.e. the bit counters have counts within the diamond 00, NOR gate 45 produces a 1; when also one of the small displays has been selected, signal SML will also be 1 and the output of gate 52 will be 0. This will disable the analog gate 49 (via the AND gate 51) for the whole of the time that the Lissajou figure is being displayed. The raw video signal is thus prevented from reaching VID OUT, and the background for the diamond of any of the small displays is therefore black. (For the large display, the output of NAND gate 52 is 1, and the Lissajou figure of the large display is therefore superimposed on the main video picture.)

If desired, the output of the one-shot 47 may also feed a colour control circuit (not shown) which sets the colour of the inserted pulses forming the Lissajou figure to a desired colour, e.g. green.

If desired, a frame or graticule can also be generated in the diamond display. This requires the generation of pulses on particular combinations of counts from the bit counters LB and RB. The resulting graticule pulses are then inserted into the video signal in the same way as the Lissajou figure pulses from the memory 22. The graticule pulses may conveniently be inserted as grey level signals.

Graticule pulses can be generated in two ways. One way is to detect the particular combinations of counts from the bit counters LB and RB by means of logic circuitry. This can readily be used to generate an outer frame for the display and lines in the display parallel to the outer frame; by using adders and subtractors, lines diagonal to the frame—i.e., lines which are horizontal and vertical—can also be generated. The other way is to use a second memory, like the memory 22, which has the graticule permanently stored in it. This second memory would be addressed by the same buses 34 and 38 as the memory 22.

The automatic gain control (AGC) circuit or compander (compressor-expander) circuit 27 includes a counter 55 the count of which is converted to analog form by a D/A converter 56, the output of which is fed to the A/D converters 20 and 21 to act as their reference voltage. The higher the count of counter 55, the higher the reference voltage, and the greater the conversion range of the converters 20 and 21. Since the converters 20 and 21 have the same reference voltage, the characteristics of the two audio channel conversions will be identical. The counter 55 is caused to count up relatively rapidly if the audio signal level rises above that corresponding to its count, and to count down relatively slowly if the audio signal strength falls below the corresponding count. This ensures that the system responds rapidly to a rise in audio signal level.

The strength of the audio signal is measured crudely by combining the two digital audio signals from the converters 20 and 21. Considering the L signal, this is processed by a logic circuit 57. The top bit of the digital L signal represents the sign of the corresponding analog signal L. If this bit is 1, the remaining 7 bits of the digital L signal are fed through a set of 7 AND gates 58 enabled by the top bit. If this bit is 0, it enables a second set of 7 AND gates 59 via an inverter 60, and this set of gates 59 is fed with the bottom 7 bits of the digital L signal via a set of 7 inverters 61. The CR signal is processed by a similar logic circuit 62.

The two 7-bit outputs of each of the logic circuits 57 and 62 are fed to a set of 7 OR gates 63. The output of these OR gates is therefore a bitwise combination of the magnitudes of the L and R audio signals, having a 1 in each position for which either of the L and R signals has a 1 (after conversion if the signal happens to be negative). A fixed 1 is fed to the 3rd bit position of the set of OR gates 63, preventing their output from falling below a lower limit.

The output of the gates 63 is fed to a comparator 64, which is also fed with the output of the counter 55. If the counter output is less than the output of the gates 63, the comparator enables a gate 65; if the counter output is greater than the output of gates 63, it enables a gate 66. The clock signal CW is fed through two divide circuits 67 and 68 in sequence, to generate clock signals at reduced rates. The output of the first divide circuit 67 is fed to gate 65, and that of the second to gate 66. Gate 65 feeds the + (up) count input of counter 55, and gate 66 feeds its − (down) count input.

The count of counter 55 therefore follows the magnitude of the audio input signals, at a limited rate and subject to a lower count limit. If the audio signal magnitude exceeds the count of counter 55, then the count is increased relatively rapidly, whereas if the audio signal magnitude is less than the count, the count decreases relatively slowly.

Of course, switchable control means can be provided for disabling the circuitry feeding the counter 55 and forcing its count to the maximum if desired.

Figure 6:
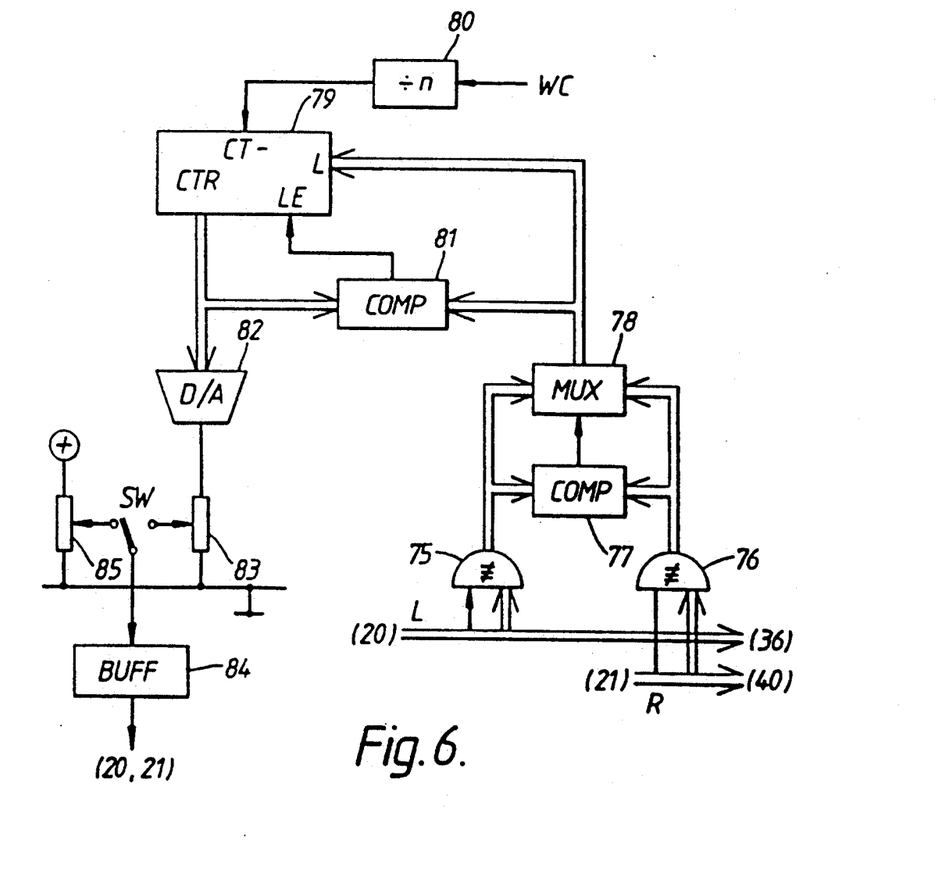
FIG. 6 is a block diagram of a modification of a part of FIG. 2A.

FIG. 6 shows an alternative form of AGC circuit. The signals from the analog-to-digital converters 20 and 21 undergo several stages of processing in this circuit. First, the signals are converted from signed to absolute values; then the larger of the two absolute values is selected; then the counter 79 is set immediately to the selected value if its count is below the selected value but counts slowly down otherwise; and finally the count in the counter is decoded to give a reference level for the converters 20 and 21.

The A/D converter 20 produces an 8-bit output, as noted above, with the extreme positive value of input (analog) signal corresponding to 1111 1111, the extreme negative to 0000 0000, and zero to 1000 0000 or 0111 1111. Thus the top bit (the left-hand bit in these representations) indicated the sign of the analog signal. The remaining 7 bits of the output of converter 20 are fed to a set of 7 equivalence gates 75 which are also all fed with the top bit. Hence if the analog signal is positive, the 7 low bits are fed through the 7 equivalence gates unchanged, and the 7-bit value corresponds directly to the value of the input signal (i.e. 000 0000 corresponds to zero, and 111 1111 to positive peak). If the analog signal is negative, the value of the 7 bits from converter 20 runs from 111 1111 (zero) to 000 0000 (peak negative); since the top bit is 0, the 7 equivalence gates 75 convert these 7-bit values to the range 000 0000 (zero) to 111 1111 (peak negative).

Hence the gate set 75 converts the 8-bit signed value from converter 20 to a 7 bit absolute amplitude. A similar set of 7 equivalence gates 76, each fed with a corresponding one of the 7 low-order bits from converter 21 and all fed with the top bit from that converter, produce the absolute value of the signal from that converter.

The two absolute values from the gate sets 75 and 76 are fed to a comparator 77 and to a multiplexer 78. The output of the comparator 77 indicates which of the two (7-bit) signals fed to it is the larger, and controls the multiplexer to select that larger value.

A counter 79 has a CT− (count down) input fed with the clock signals WC via a divider 80. Its count therefore tends to decrease slowly but regularly. The output of this counter is fed to a comparator 81, which is also fed with the output of the multiplexer 78, and the output of this comparator is fed to the load enable input LE of the counter 79. The output of the multiplexer is fed to the load input L of this counter. If the count of the counter falls below the output of the multiplexer, the load input is enabled and the output of multiplexer is immediately loaded into the counter. The count of the counter therefore decreases gradually for as long as the absolute value of the larger of the signals from the converters 20 and 21 exceeds that count, but is immediately forced up to that value the moment that value rises above the count in the counter.

The output of the counter 79 is also fed to a digital-to-analog converter 82, the output of which is passed through an adjustable scaling circuit 83 to an analog buffer circuit 84 the output of which is fed to the analog-to-digital converters 20 to 21 as their scaling reference level.

An effective lower limit can be set for the count of the counter 79 by various means. One of the lower order bits from the multiplexer 78 can be forced to 1. (If this is done, that bit and any bits of still lower order are irrelevant for the AGC circuitry and their circuits can be omitted, reducing the number of bits processed by the AGC circuitry.) Alternatively, the input to the digital-to-analog converter 82 can have a low-order part with at least a leading 1 added below the bits from the counter 79. (Again, the AGC circuitry may ignore some of the lowest-order bits from the converters 20 and 21.)

A switch SW allows selection between the varying reference level from scaling circuit 83 and a fixed level from a second adjustable scaling circuit 85, which is preferably set so that the saturation level of the converters 20 and 21 is the peak nominal audio signal level. With the scaling circuit 85 selected, any excursion of the audio signal beyond the peak nominal level is readily recognizable, since the Lissajou figure reaches and runs along the edge of the diamond in which it is displayed.

It is possible to detect such saturation or its imminence and cause a distinctive colouration of the Lissajou figure. Saturation occurs when either of the 8-bit signals from the converters is either hex 00 or FF; an upper byte of hex 0 or F may be taken as indicating its imminence. Such colouration may be either the whole of the Lissajou figure or just the saturated part, and the hue may if desired be made dependent on the degree of saturation and/or whether the saturation is of the left, right, or both channels.

It is obvious that several different audio stereo signals can be monitored on a single monitor by providing a separate monitoring system for each signal. Also, two unrelated audio signals (e.g. signals in two different languages) can be fed to the present system, which would then give a simple indication of whether both signals are present or one or other (or both) are absent.

I claim:

1. Apparatus for monitoring stereo audio signals associated with a TV video signal by generating a Lissajou figure, said apparatus comprising:
   analog-to-digital converter means (20, 21) for converting the two channels of the stereo audio signal to instantaneous values in digital form, a first memory (22) into which bits are written at addresses formed by successive pairs of said instantaneous values in digital form to form a map therein of a display of a Lissajou figure representing the relationship between the two channels, read-out means (26) for reading out the first memory linearly in synchronism with the operation of a monitor (10), and insertion means (24) for inserting the memory output into the TV video signal (VID IN), wherein the readout means (26) read the first memory out diagonally, so as to produce a diamond display on monitor (10).

2. Apparatus according to claim 1 characterised in that the read-out means comprise a line counter (LL, RL) and a bit counter (LB, RB) for each channel, the line counters being loaded with predetermined counts at the beginning of each field and counting lines and the bit counters being loaded from the line counters at the beginning of each line and counting bits along the lines, three of the counters (LL, RL, RB) counting in one direction and the fourth (RL) in the other.

3. Apparatus according to claim 2 characterised in that the capacity of the counters (LL, LB, RL, RB) is larger than the size of the first memory, the excess high-order portion of the counts being used to control (via 45, 52) the enabling of the first memory read-out.

4. Apparatus according to claim 3 characterised by a display location selection memory (30) containing one or more pairs of prestored counts which can be selected for loading into the line counters (LL, RL).

5. Apparatus according to claim 1 characterised by a graticule means for generating a graticule on the display.

6. Apparatus according to claim 5 characterised in that the graticule means comprise logic circuitry driven by the circuitry which reads out the first memory.

7. Apparatus according to claim 5 characterised in that the graticule means comprise a second memory which is read out in parallel with the first memory.

8. Apparatus according to claim 3 characterised in that the insertion means comprise pulse stretching means (47) fed from the read-out means, adder means (48) fed from the pulse stretching means, and gating means (49) fed from the pulse stretching means and feeding the adder means.

9. Apparatus according to claim 3 characterised in that gating means (49) are controlled partially or wholly by the excess portion of the counts.

10. Apparatus according to claim 9 characterised in that the insertion means include means (45, 52, 51) operable either to superimpose the Lissajou figure on the video picture on the TV monitor or to generate a uniform background to the Lissajou figure.

11. Apparatus according to claim 6 characterised in that the insertion means includes means for inserting the graticule at a different brightness to that of the Lissajou figure.

12. Apparatus according to claim 1 characterised by AGC (automatic gain control) means for controlling the size of the Lissajou figure).

13. Apparatus according to claim 12 characterised in that the AGC means comprise a digital-to-analog converter (56; 82) which provides a reference voltage to the analog-to-digital converter means (20, 21).

14. Apparatus according to claim 12 characterised in that the AGC means comprise a counter (55; 79) which is caused to count up or down depending on whether a magnitude of an input audio signal is greater or less than the count.

15. Apparatus according to claim 14 characterised by means (64–67) causing a counting rate of the counter to be larger if the count is low than if it is high.

16. Apparatus according to claim 14 characterised by means (80, 81) causing the counter to count down gradually if the count is high, and be reset immediately to the magnitude of the input audio signal if the count is low.

17. Apparatus according to claim 14 characterised by means for holding the count of the counter (55; 79) above a minimum signal 18. Apparatus according to claim 8 wherein said gating means are controlled partially or wholly by the excess portion of the counts.

19. Apparatus according to claim 5 wherein said insertion means includes means for inserting the graticule at a different brightness to that of the Lissajou figure.

* * * * *